(12) United States Patent
Rivard et al.

(10) Patent No.: US 9,277,415 B2
(45) Date of Patent: Mar. 1, 2016

(54) RESOURCE SHARING PRIORITY

(71) Applicant: Broadcom Corporation, Irvine, CA (US)

(72) Inventors: Erik John Rivard, San Diego, CA (US); Lih-Feng Tsaur, San Diego, CA (US); Shawn Shiliang Ding, San Diego, CA (US); Hsiao-Kai Wang, San Diego, CA (US); Shanshan Jiang, San Diego, CA (US); Daochun Liu, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/336,585

(22) Filed: Jul. 21, 2014

(65) Prior Publication Data

US 2015/0031303 A1  Jan. 29, 2015

Related U.S. Application Data (60) Provisional application No. 61/858,861, filed on Jul. 26, 2013.

(51) Int. Cl.
*H04W 16/14* (2009.01)
*H04W 48/16* (2009.01)
*H04W 88/06* (2009.01)

(52) U.S. Cl.
CPC .............. *H04W 16/14* (2013.01); *H04W 48/16* (2013.01); *H04W 88/06* (2013.01)

(58) Field of Classification Search
CPC ...... H04W 16/14; H04W 88/06; H04W 8/005
See application file for complete search history.

(56) References Cited

U.S. PATENT DOCUMENTS

| | | | | |
|---|---|---|---|---|
| 8,848,730 | B1* | 9/2014 | Vleugels et al. | 370/443 |
| 2008/0081675 | A1* | 4/2008 | Pinder | 455/574 |
| 2010/0232436 | A1* | 9/2010 | Fujii et al. | 370/400 |
| 2012/0140745 | A1* | 6/2012 | Jeon et al. | 370/336 |
| 2012/0166580 | A1* | 6/2012 | Koo et al. | 709/217 |
| 2014/0233444 | A1* | 8/2014 | Wang | 370/311 |

* cited by examiner

*Primary Examiner* — Sujatha Sharma
(74) *Attorney, Agent, or Firm* — Brinks Gilson & Lione (57) ABSTRACT

A device implements multiple protocols that share overlapping resources. In some cases, a first operation, such as a scan, may have a resource conflict with a second operation associated with a different protocol. In some cases, determining grant normal priority level requests associated with the first operation over those at the normal priority level associated with the second operation may lead to operator-noticeable degradation in device performance. A protocol controller may request a selected portion of the first operation at a low priority level. Requesting the selected portion at the low priority level may allow the second operation to selectively override the portion of the first operation. The selective overriding of the first operation may allow for execution of the first and second operations without operator-noticeable performance degradation.

20 Claims, 8 Drawing Sheets

RESOURCE SHARING PRIORITY

PRIORITY CLAIM

This application claims priority to provisional application Ser. No. 61/858,861, filed 26 Jul. 2013, which is entirely incorporated by reference.

TECHNICAL FIELD

This disclosure relates to wireless communication, and coexistence in wireless communication devices.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries.

DETAILED DESCRIPTION

The discussion below relates to resource sharing priority in a wireless coexistence environment on a device such as user equipment. Multiple communication stacks or protocols may share hardware elements such as antenna, oscillators, antennas, baseband processors, and/or other transceiver elements. In some cases, various instances of the hardware elements may support use by one protocol at a time, but not multiple protocols simultaneously. For example, the ANT protocol utilizes hardware elements used by personal area network (PAN) protocols, such as Bluetooth (BT) and Bluetooth Low Energy (BLE). For example scenario, a PAN protocol scan and an ANT scan may use overlapping resources that may lack support for both scans simultaneously. If the full PAN scan is given priority over the ANT scan, ANT performance may degrade. Similarly, if the full ANT scan is given priority over the PAN scan, PAN performance may degrade. The techniques and architectures discussed below discuss selecting multiple priority levels for one or more of the scans such that the scans may be given partial access the overlapping resources. The partial access by the multiple protocols may mitigate the performance degradation associated with allowing a full scan for a single one of the multiple protocols.

Figure 1:
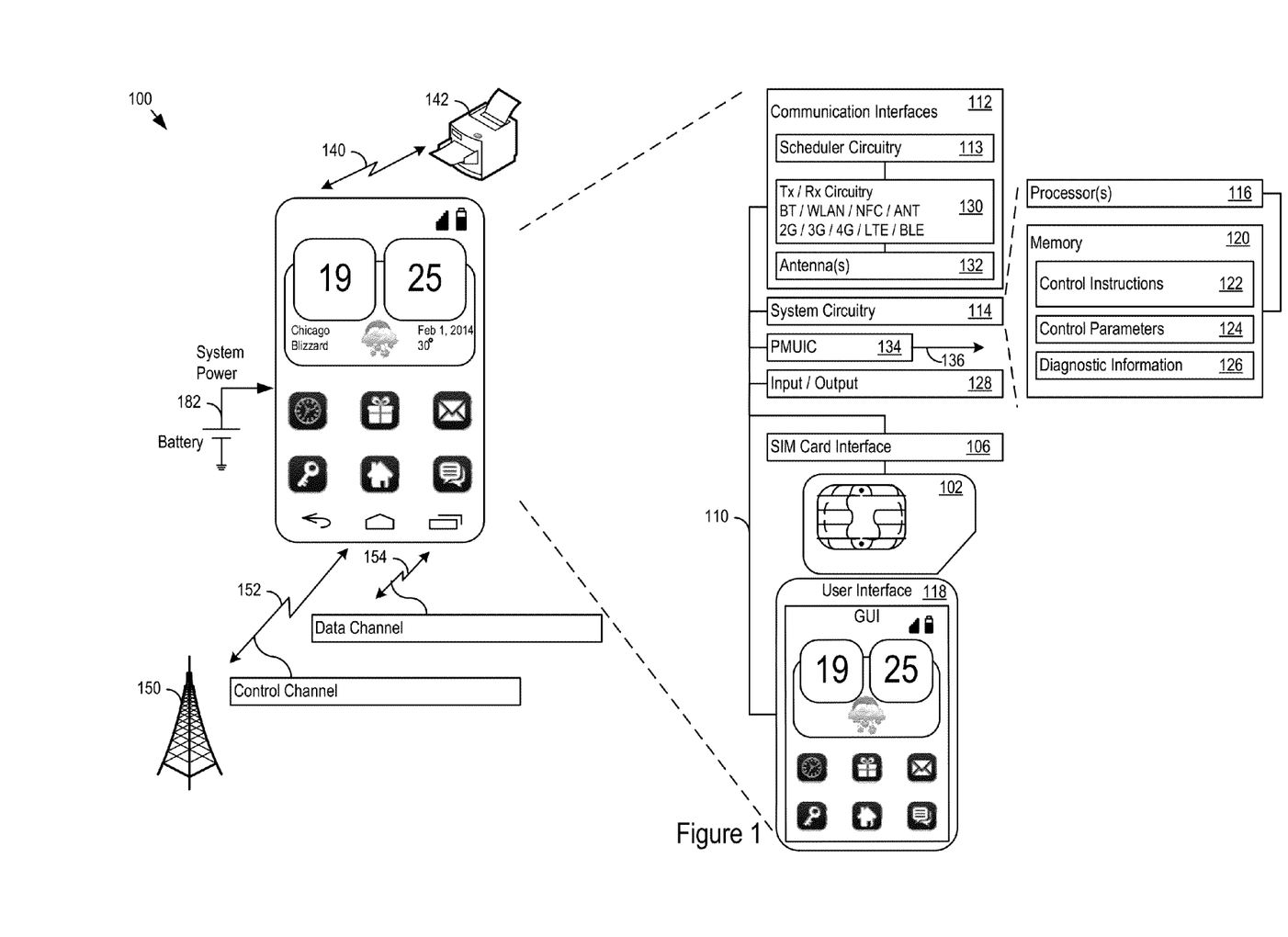
FIG. 1 shows an example of user equipment.

FIG. 1 shows an example of user equipment 100 ("UE 100"). The UE 100 is a smartphone in this example, but the UE may be any electronic device. The techniques described for implementing priority in resource sharing may be used in a wide array of different types of devices. Accordingly, the smartphone example described below provides just one example context for explaining the resource priority sharing techniques.

As one example, the UE 100 may be a 2G, 3G, or 4G/LTE cellular phone capable of making and receiving wireless phone calls, and transmitting and receiving data using 802.11 a/b/g/n/ac/ad ("WiFi"), BT, BLE, ANT, Near Field Communications (NFC), or any other type of wireless technology. The UE 100 may also be a smartphone that, in addition to making and receiving phone calls, runs any number or type of applications. The UE 100 may, however, be virtually any device that transmits and receives information, including as additional examples a driver assistance module in a vehicle, an emergency transponder, a pager, a satellite television receiver, a networked stereo receiver, a computer system, music player, a workout monitor, pedometer, smart watch, or virtually any other device.

FIG. 1 shows an example of the UE 100 in communication with a network controller 150, such as an enhanced Node B (eNB) or other base station. The network controller 150 and UE 100 establish communication channels such as the control channel 152 and the data channel 154, and exchange data. In this example, the UE 100 supports one or more Subscriber Identity Modules (SIMs), such as the SIM1 102. Electrical and physical interface 106 connects SIM1 102 to the rest of the user equipment hardware, for example, through the system bus 110.

The UE 100 includes communication interfaces 112, system logic 114, and a user interface 118. The system logic 114 may include any combination of hardware, software, firmware, or other logic. The system logic 114 may be implemented, for example, with one or more systems on a chip (SoC), application specific integrated circuits (ASIC), discrete analog and digital circuits, and other circuitry. The system logic 114 is part of the implementation of any desired functionality in the UE 100. In that regard, the system logic 114 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 and the inputs 128 may include a graphical user interface, touch sensitive display, voice or facial recognition inputs, buttons, switches, speakers and other user interface elements. Additional examples of the inputs 128 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 114 may include one or more processors 116 and memories 120. The memory 120 stores, for example, control instructions 122 that the processor 116 executes to carry out desired functionality for the UE 100. The control parameters 124 provide and specify configuration and operating options for the control instructions 122. The memory 120 may also store any BT, ANT, BLE, WiFi, 3G, or other data 126 that the UE 100 will send, or has received, through the communication interfaces 112. The UE 100 may include a power management unit integrated circuit (PMUIC) 134. In a complex device like a smartphone, the PMUIC 134 may be responsible for generating as many as thirty (30) different power supply rails 136 for the circuitry in the UE 100. In various implementations, the system power may be supplied by a power storage device, such as a battery 182

In the communication interfaces 112, Radio Frequency (RF) transmit (Tx) and receive (Rx) circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

In some implementations, the UE 100 may use communication interfaces 112 to maintain a network connection 140 to a peripheral device 142. The connection 140 may include a PAN connection, ANT connection, or other network connection. The UE 100 may scan the bandwidth ranges of the connection 140 to discover devices and maintain connections, such as the connection 140.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 112 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

As just one implementation example, the communication interface 112 and system logic 114 may include a BCM82128 chip. These devices or other similar system solutions may be extended as described below to provide the additional functionality described below. These integrated circuits, as well as other hardware and software implementation options for the UE 100, are available from Broadcom Corporation of Irvine Calif.

Chips which support multiple functionalities may be referred to as "combo chips". A combo chip may support Bluetooth, Bluetooth Low Energy, wireless local area networking (WLAN), and ANT. In some cases, these protocols may share resources (e.g. bandwidth, hardware and antenna, etc.). Different protocols may have different usage profiles. To allow for operation of these protocols, resources may be scheduled for usage. For example, a protocol may reserve a resource for a given period. Scheduler circuitry 113 may be configured to facilitate resource sharing.

Various protocols may operate independently. In some cases, a particular resource may be requested by multiple protocols at the same time resulting in a collision. The scheduler circuitry 113 may use multiple priority levels to handle collisions. In some implementations, when two or more requests overlap, the highest priority request may be granted.

The UE 100 may implement multiple priority levels, e.g., normal, high (e.g., higher than normal), and highest (e.g., higher than normal and high). The priority levels may have specific names. In some implementations, an ANT controller may use levels such as a normal priority level, above audio transfer priority, and above voice call priority. For example, these priority levels may include a "Normal priority level, an "Above the advanced audio distribution profile (A2DP) priority level", and an "Above the synchronous connection oriented (SCO) priority level".

The scheduler circuitry 113 may treat activity from a PAN controller as normal activity, audio transfer activity, voice call activity, or as other activity types. For example, these priority levels may include, "Normal PAN Activity" priority level, "A2DP activity" priority level, and an "SCO activity" priority level. Control software for the ANT system, e.g., the protocol stack, can direct the PAN controller to schedule ANT activity on one of the different priority levels. The ANT system may acquire operational resources in this manner.

An ANT scan is an activity by which the ANT control software detects devices (e.g. sensors, etc.) within range. In some cases, ANT scans are performed regularly to facilitate connectivity with proximate devices (e.g. collect sensor data, poll devices, etc.). In some cases, an ANT scan receive window size may be about 1250 µs, but other sizes are also possible.

In some implementations, the scheduler 113 may receive requests for repeated ANT scans (e.g. from an ANT protocol stack) and receive requests for continuous (or continual) PAN scans (e.g. from a Bluetooth or BLE protocol stack). In some cases, a collision may occur in a coexistence environment. In cases of collisions, some ANT requests may be denied or some PAN requests may be denied. The requests with higher priority may be granted over lower priority requests.

In an example, the ANT scan may be implemented to alternately use the "Normal priority level" and "above A2DP priority level". In the example, ANT scan are requested using "Normal priority level" and "Above A2DP priority level". The ANT control software may use one "Above A2DP priority level" per six requests. This may ensure the operation of other protocols is not unduly interrupted.

Figure 2:
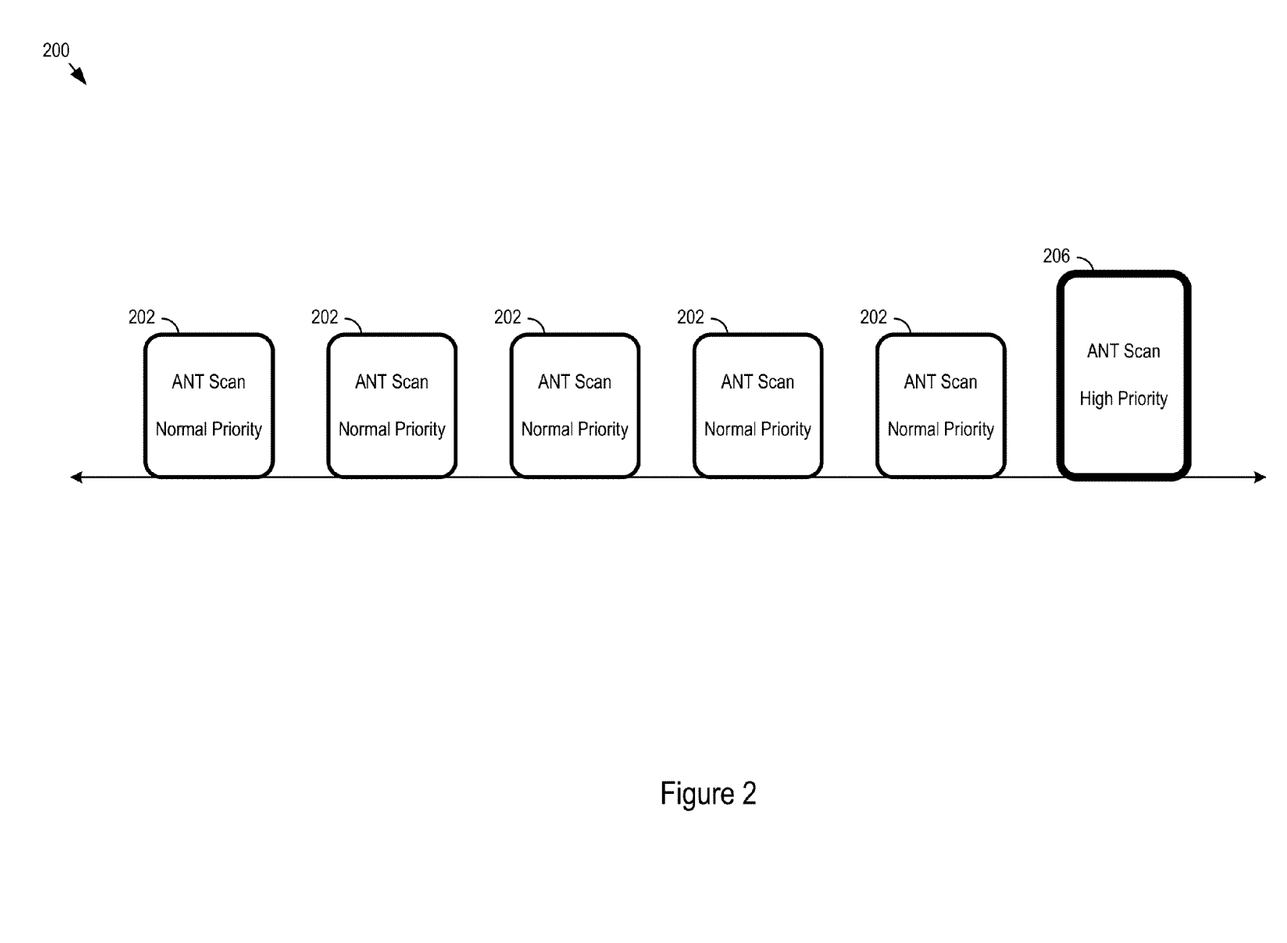
FIG. 2 shows an example set of scan requests.

FIG. 2 shows an example set 200 of scan requests. The example set 200 includes five normal priority level requests 202. A high priority level request 206 follows the normal priority level request 202.

Figure 3:
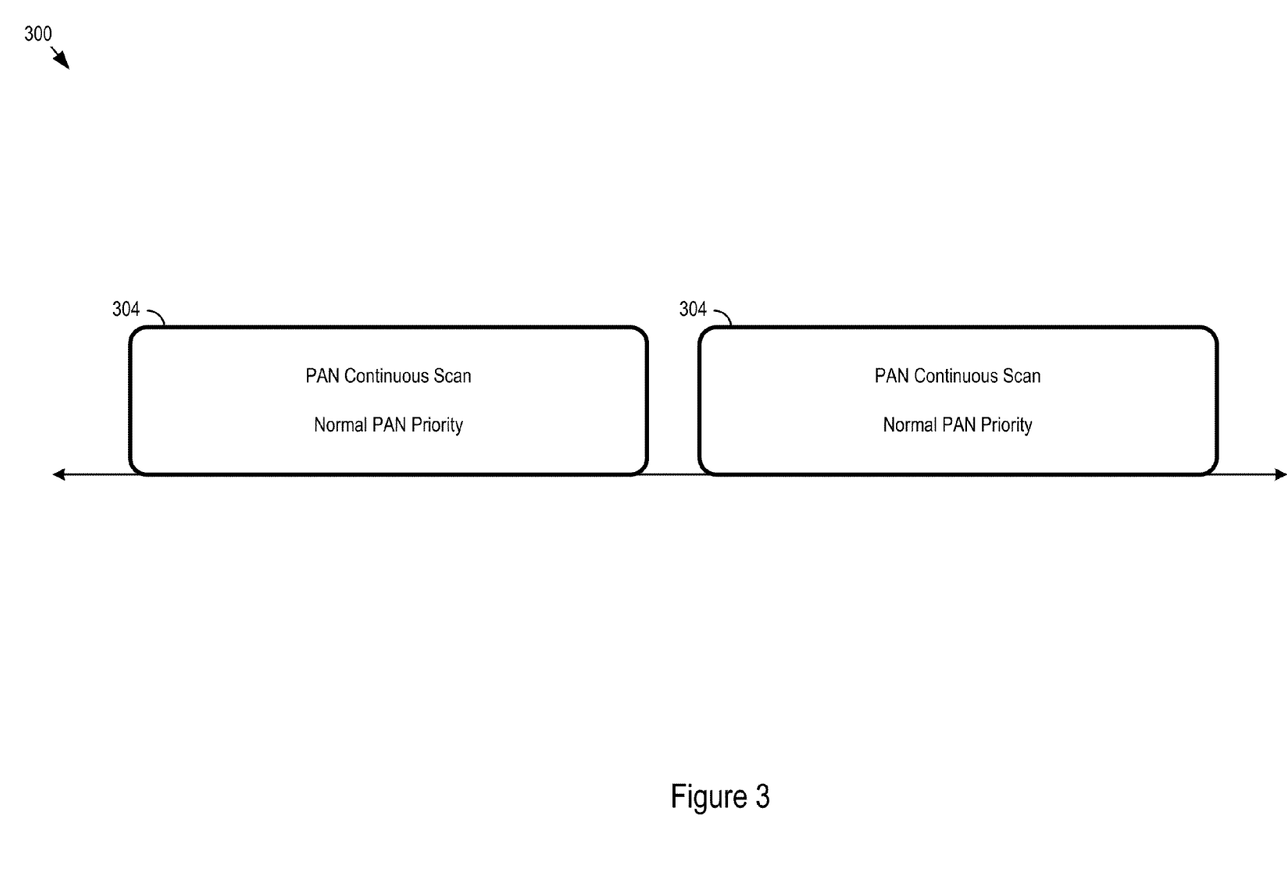
FIG. 3 shows an example set of continuous scan requests at the normal personal area network (PAN) priority level.

In the example, the PAN controller may make requests for continuous scans at a normal PAN priority level. FIG. 3 shows an example set 300 of continuous scan requests 304 at the normal PAN priority level.

In some cases, the five normal priority level requests may collide with normal PAN priority level requests for scans from the PAN protocol.

When collisions occur, an ANT scan request or a PAN scan request may be denied. In some cases, the denial of a scan may not reduce performance to a point where an operator of the UE 100 may notice the reduction. However, when a large portion of scans are denied, performance may be degraded by a noticeable amount. For example, an operator may not notice a connection delay to a new device of 100s of milliseconds or up to a few seconds. However, extended delays of tens of seconds or minutes may degrade the operator's experience.

Colliding normal priority and normal PAN priority scan requests may result in different outcomes depending on whether normal ANT requests are given priority over normal PAN requests or vice versa.

Figure 4:
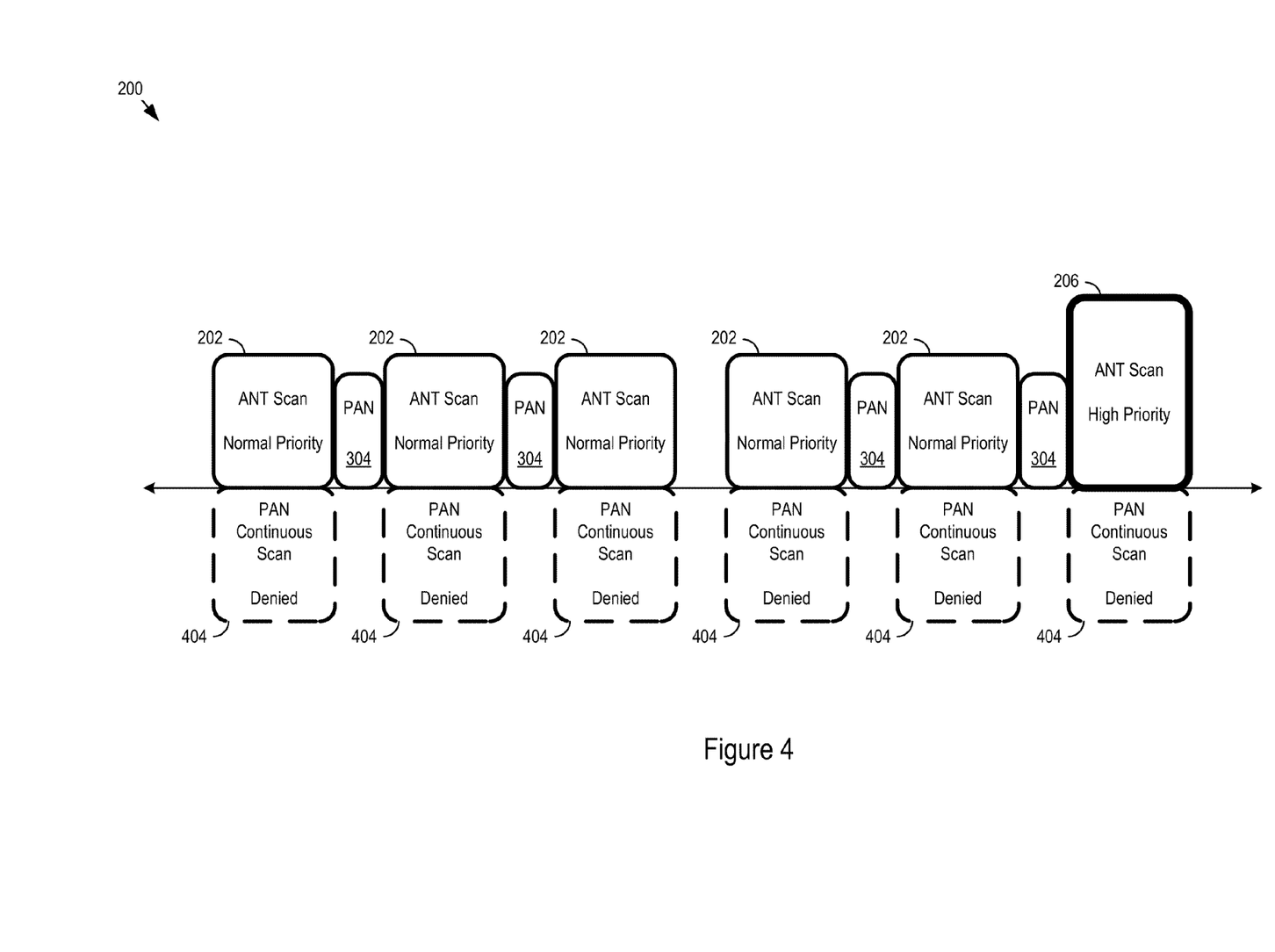
FIG. 4 shows an example scenario with normal priority ANT scan requests being granted over the normal PAN priority level requests.

FIG. 4 shows an example scenario 400 with normal priority ANT scan requests 202 being granted over the normal PAN priority level requests 304, 404. In the example scenario 400, the ANT normal priority level scan requests 202 may be treated as higher priority than the continuous PAN scan request 304, 404 by the PAN scheduler circuitry 113. Because the ANT scan requests 402 are treated as higher priority, the ANT scan requests 202 may be granted. The overlapping normal PAN priority level requests 404 are denied. In such cases, there may be no effect on ANT scan performance.

If the ANT scan is treated as higher priority, some portion of the PAN continuous scan request may be denied. For example, a continuous BLE scan may be granted when no ANT requests are made. For the example repeating group of six ANT scans, an example continuous BLE scan request may be granted about 30% of its requested bandwidth. This may or may not degrade performance by an operator noticeable amount.

Figure 5:
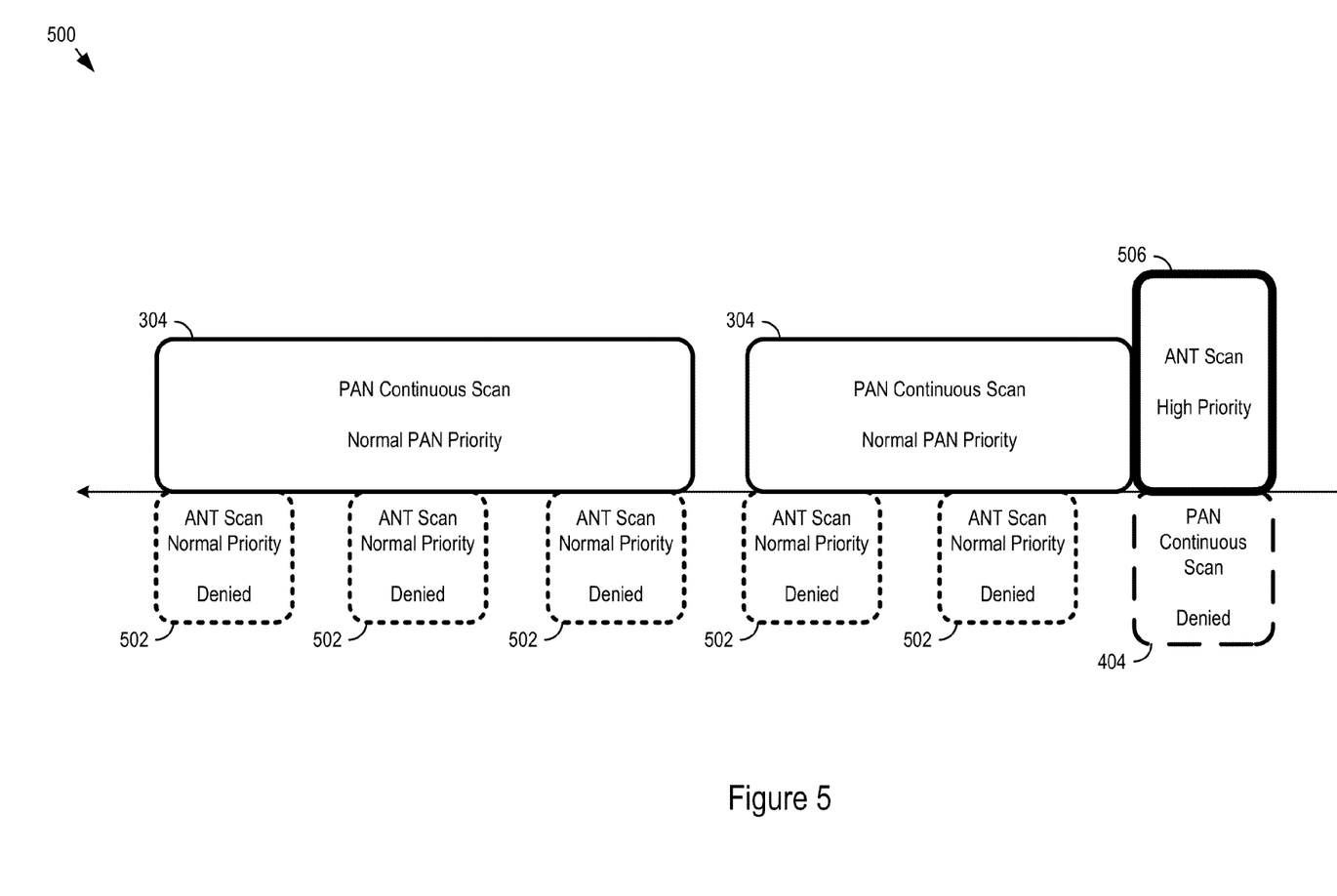
FIG. 5 shows an example scenario with normal priority level ANT scan requests denied in favor of normal PAN priority level requests.

FIG. 5 shows an example scenario 500 with normal priority level ANT scan requests 502 denied in favor of normal PAN priority level requests 304. In the example scenario 500, the overlapping ANT normal priority level scans 502 may be treated as lower priority than the continuous PAN scan request 304 by the scheduler circuitry 113. Because the ANT scan requests 502 are treated as lower priority, the normal priority ANT scan requests 502 may be denied and the high priority ANT scan request 206 may be granted over the denied normal PAN priority request 404. Many ANT scan requests 502, 206 may be denied (e.g. five out of six may be denied) and the continuous PAN scan request 504 may be largely uninterrupted (e.g. 90% of the PAN scan bandwidth may be granted). In such cases, the allocation of resources may cause an operator-noticeable effect on ANT scan performance.

In some implementations, a low priority level may be used. The low priority level may be lower priority than the normal priority level. Some ANT scan requests may be made at the low priority level. Other scan requests, e.g., scan requests, and/or other request types may be granted over low priority level ANT scan requests.

Figure 6:
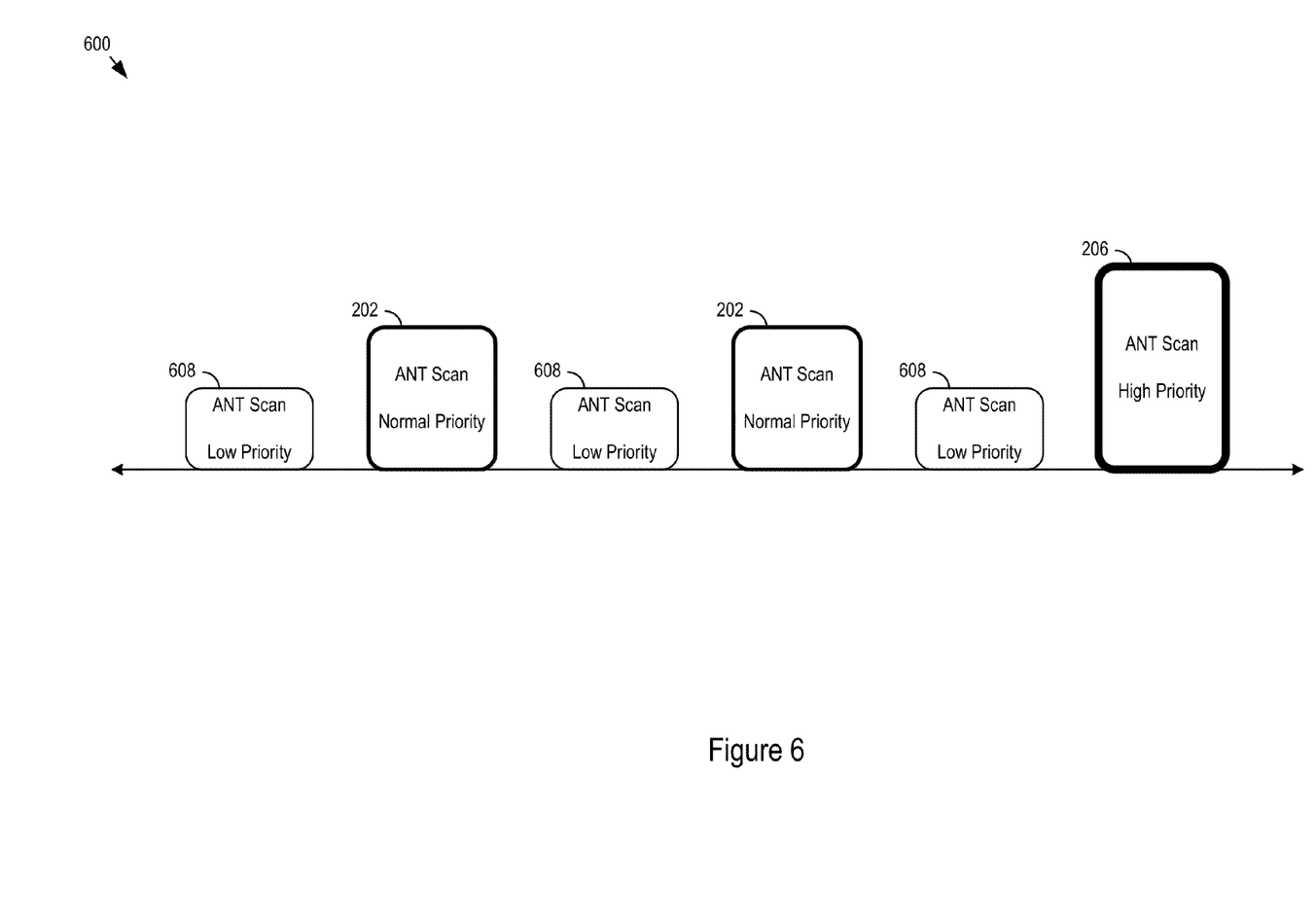
FIG. 6 shows an example set of scan requests.

In some cases, ANT scan requests may be made using a combination of low priority level requests, normal priority level requests, and high priority level requests. FIG. 6 shows an example set 600 of scan requests. In the example set 600, the UE 100 may make three ANT scan requests 608 at the low priority level, two ANT scan requests 202 at the normal priority level, and one ANT scan request 206 at the high priority level for the six requests per group.

Figure 7:
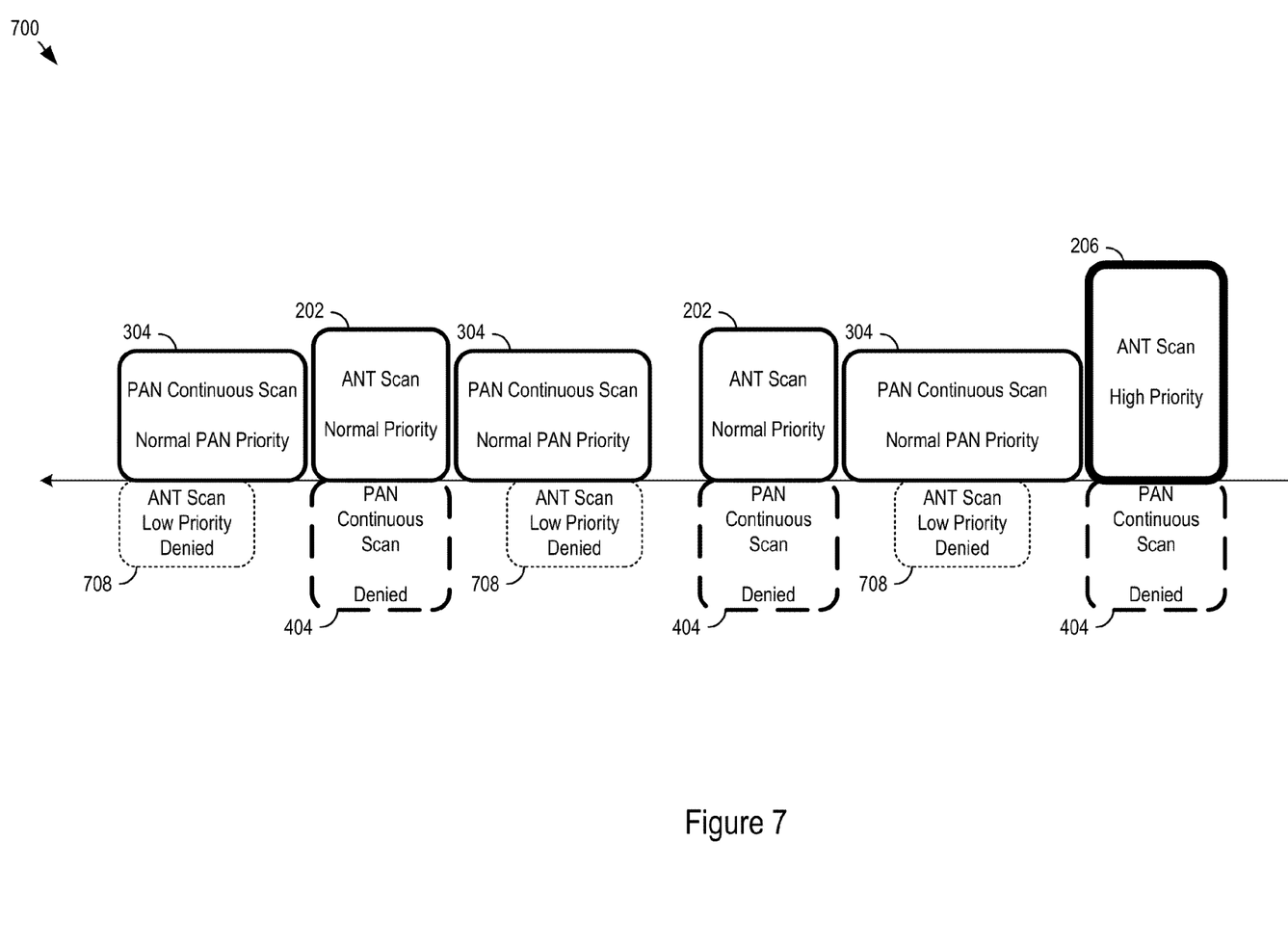
FIG. 7 shows an example scenario with scan request grants.

In some implementations, normal priority level ANT scan requests may be granted over PAN scan requests. The low priority level ANT scan requests may be denied in favor of the PAN scan request. The low priority level assignment may allow for a selected portion of the ANT scans to be overridden by the PAN scans. FIG. 7 shows an example scenario 700 with scan request grants. The low priority ANT scan requests 708 may be overridden by the continuous PAN scan request 304. The normal priority ANT scan requests 202 may be granted over the corresponding overlapping portions of the continuous PAN scan request 404 by the scheduler circuitry 113. The scheduler circuitry 113 may grant the ANT controller and the PAN controller an appreciable portion of their respective scan requests. For example, 50% of the ANT scans may be granted along with a grant of about 68% of the requested Bluetooth scans. The ANT protocol and PAN protocol may have degradation small enough that no noticeable effect is experienced by the operator of the UE 100.

In some implementations, multiple priority levels may be assigned to PAN activity. For example, a low priority level may be assigned to a portion of the PAN scan and a normal PAN priority level may be applied to another portion of the scan. The example priority assignments to the PAN scans may allow a selected portion of the PAN scan to be overridden by the ANT scan.

The priority requests may also implement other patterns of priority level. For example, a two low priority level (L) requests may be made for every normal priority level (N) request with a high priority (H) request once every eight requests (e.g. L-L-N-L-L-N-L-L-H). Two N requests may be made for every L request, (e.g. N-N-L-N-N-L-N-N-H). Alternatively or additionally, other patterns may be shorter or longer than these examples.

Alternatively or additionally, the priority may be assigned dynamically based on grant or denial history. For example, after three denied scans an A request may be made. Other historical information may also be used. A history of device connections for one or more the protocols may be used. For example, usage of a particular protocol may be associated with a particular time of day, day of week, type of day, or date. In an example, an operator may tend to use a connection to an ANT device for a morning workout, but rarely make ANT device connections at other times. Hence, in the morning a smaller share of ANT scan request by the ANT controller may be made at a priority level likely to be denied by the scheduler. In another example, after a certain period of non-usage, the relative portion of normal and/or high priority scan request for a protocol may be reduced.

Alternatively or additionally, priority may be randomly assigned to a set of requests, e.g., stochastically or pseudo-randomly, or other probabilistic determination, to meet a given ratio of level requests For example, a selected ratio may include 60% L requests, 35% N request, and 5% H requests.

Additionally or alternatively, the priority system may be applied to other ANT and/or PAN operations for which resource scheduling is used (e.g. data transmission, audio transfer, voice calling, or other operations).

The principles and architectures discussed may be applied to other coexistence systems. Virtually any priority based collision resolution scheme may implement such priority level schemes accordingly.

Figure 8:
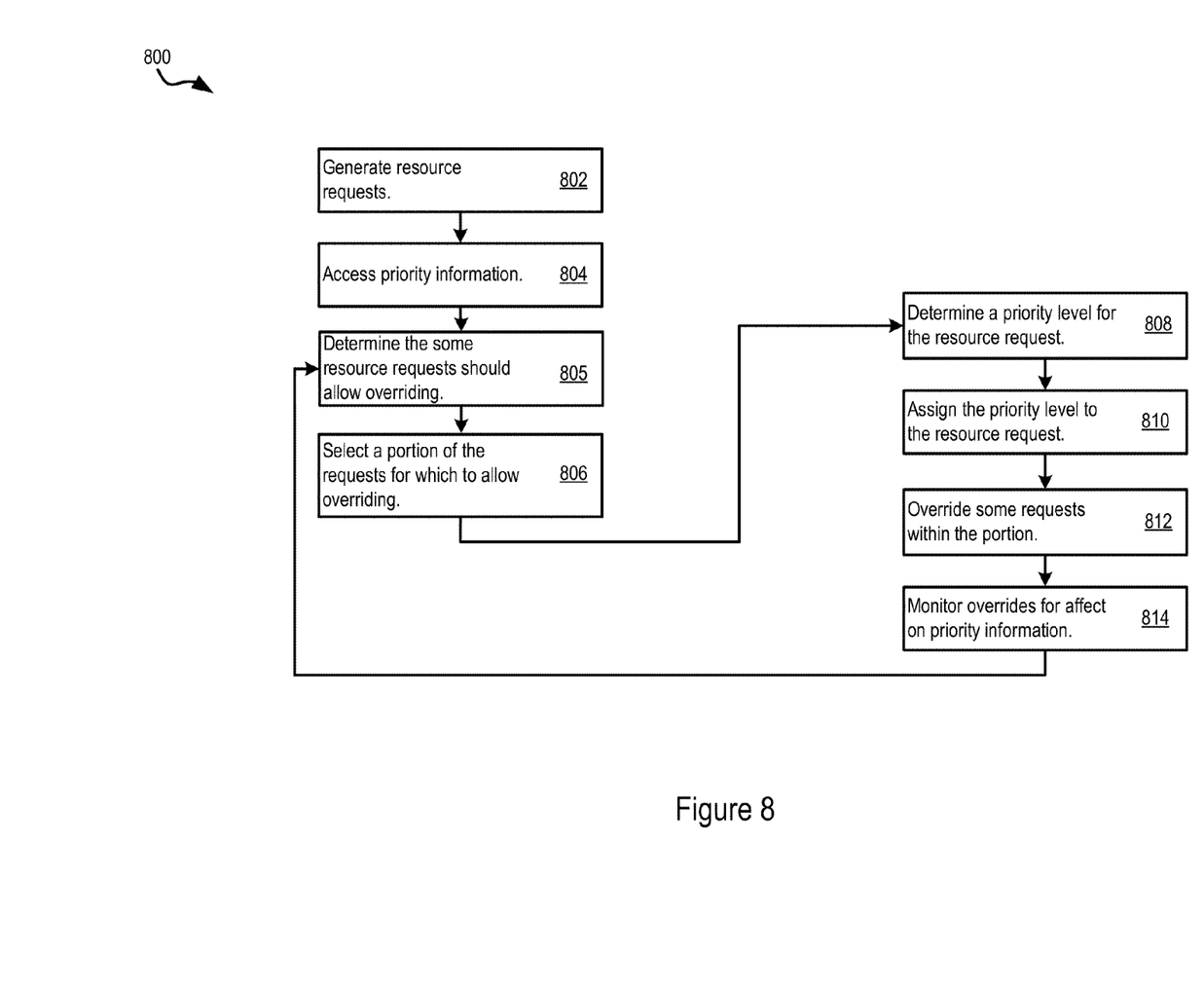
FIG. 8 shows example logic for resource request priority assignment.

FIG. 8 shows example logic 800 for resource request priority assignment. In various implementations, the example logic 800 may be used by a PAN controller, ANT controller, and/or scheduling circuitry to assign priority to resource requests. The logic 800 may generate a resource request (802). The logic 800 may access priority information (804). For example, the logic may access historical data related to resource usage, grants, device connections, and/or other historical data. In another example, the priority information may include a pattern by which priority is assigned. In another example, the priority information may include a randomly generated number on which the logic 800 may base its priority assignment. Based on the priority information, the logic 800 may determine that some resource requests should allow overriding (805). For example, based on historical data, the logic 800 may determine that the majority of PAN scan requests have been denied. In the example, the logic may determine to allow some ANT scan requests to be overridden in response. The logic 800 may select a portion of resource requests for which to allow overriding by colliding requests (806). In various implementations, the selection of the portion may be based on the priority information. Responsive to the selection of the proportion, the logic 800 may determine a priority level for the resource request (808). The logic 800 may assign the priority level to the resource request (810).

The logic 800 may override some requests within the portion for which overriding is allowed (812). The logic 800 may monitor the overrides for their effect on the priority information (814). If the overrides affect the priority information, the logic may return to 805. In the example above, the logic may have previously determined the majority of PAN requests have been denied based on historical data. However, ins some cases, after allowing some ANT requests to be overridden, the majority of ANT requests may be denied. The logic 800 may then review the updated priority information and determine if changes should be made.

In some implementations, to allow for overriding the logic 800 may attempt to create a priority slot for PAN scans within an upcoming group of ANT scans. For example, an upcoming group of ANT scan requests at the normal ANT priority level may cause a portion of PAN scan requests at the normal PAN priority level to be rejected. If the portion is large enough to create an operator noticeable effect on performance, the logic 800 may change a portion of the upcoming group of ANT scan request to the low priority level to create a priority slot by which an increased portion of the PAN scan requests may pre-empt the predetermined portion of the ANT scans.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method, comprising:
executing a PAN protocol stack in a communication device;
executing an ANT protocol stack in the communication device;
identifying an upcoming sequence of individual ANT scans;
identifying an upcoming PAN scan;
assigning at least two different priority levels to the upcoming sequence of individual ANT scans, and thereby creating a priority level slot for the upcoming PAN scan, the priority level slot configured to permit the upcoming PAN scan to pre-empt a pre-determined portion of the upcoming sequence of individual ANT scans; and
selectively permitting access by the PAN protocol stack and the ANT protocol stack to a transceiver in the communication device according to a priority level resolution mechanism applied to the upcoming sequence of individual ANT scans and upcoming PAN scan.

2. The method of claim 1, where:
the upcoming sequence of individual ANT scans includes multiple ANT scans having in common a first priority level; and
assigning comprises assigning at least one of the ANT scans at the first priority level to be at one of the two different priority levels.

3. The method of claim 1, further comprising determining the portion of the upcoming sequence of individual ANT scans.

4. The method of claim 3, wherein the determination of the portion of the upcoming sequence of individual ANT scans is based on historical usage of the transceiver.

5. The method of claim 4, wherein historical usage comprises an instance of an individual ANT scan being overridden by a PAN scan.

6. The method of claim 4, wherein historical usage comprises a device connection history for the PAN protocol, the ANT protocol, or both.

7. The method of claim 1, wherein the portion allows for a target distribution of access to the transceiver.

8. A device, comprising:
a transceiver configured to:
perform a first scan, the first scan compliant with a first wireless protocol; and
perform a second scan, the second scan compliant with a second wireless protocol; and
control circuitry configured to:
assign a first priority level to the first scan, the first priority level below an audio transfer priority level;
assign a second priority level to a first portion of the second scan, the second priority level above the first priority level and below the audio transfer priority level;
assign a third priority level to a second portion of the second scan, the third priority level below the first priority level, the second portion of the second scan configured to allow a selected amount of the second scan to be overridden by the first scan; and
responsive to the priority levels, determine whether to allow access to the transceiver by the first wireless protocol or by the second wireless protocol.

9. The device of claim 8, wherein the control circuitry is configured to assign a fourth priority level to a third portion of the second scan, the fourth priority level above the audio transfer priority level and below a voice call priority level.

10. The device of claim 8, wherein the control circuitry is configured to execute a PAN networking stack compliant with the first wireless protocol and a ANT networking stack compliant with the second wireless protocol.

11. The device of claim 8, wherein the control circuitry is configured to determine the first portion, the second portion, or both.

12. The device of claim 11, wherein the control circuitry is configured to determine the first portion, the second portion, or both based on historical usage of the transceiver.

13. The device of claim 11, wherein the control circuitry is configured to attempt to obtain a target distribution of access to the transceiver for the first wireless protocol and the second wireless protocol via the determination.

14. The device of claim 8, wherein the control circuitry is further configured to assign a fourth priority level to a third portion of the second scan, the fourth priority level above the audio transfer priority level and below a voice call priority level.

15. A product, comprising:
a computer-readable medium other than a transitory signal; and
instructions stored on the medium, the instructions configured to, when executed:
assign a first priority level to a first scan, the first priority level below an audio transfer priority level, the first scan compliant with a personal area network (PAN) protocol;
assign a second priority level to a first portion of a second scan, the second priority level above the first priority level and below the audio transfer priority level, the second scan compliant with an ANT protocol;
assign a third priority level to a second portion of the second scan, the third priority level below the first priority level, the second portion of the second scan configured to allow a selected amount of the second scan to be overridden by the first scan; and
responsive to the priority levels, determine whether to allow access to a transceiver by the PAN protocol or by the ANT protocol.

16. The product of claim 15, wherein instructions are further configured to, when executed, determine the second portion of the second scan based on historical usage of the transceiver.

17. The product of claim 16, wherein historical usage comprises an instance of the second scan being overridden by the first scan.

18. The product of claim 16, wherein historical usage comprises a device connection history for the PAN protocol, the ANT protocol, or both.

19. The product of claim 15, wherein the selected amount of the second scan allows for a more equal distribution of access to the transceiver than if the second scan were performed at only the second priority level or only the third priority level.

20. The product of claim 15, wherein the instructions are further configured to, when executed, assign a fourth priority level to the second scan, the fourth priority level above the audio transfer priority level and below a voice call priority level.

* * * * *